Figure 1:
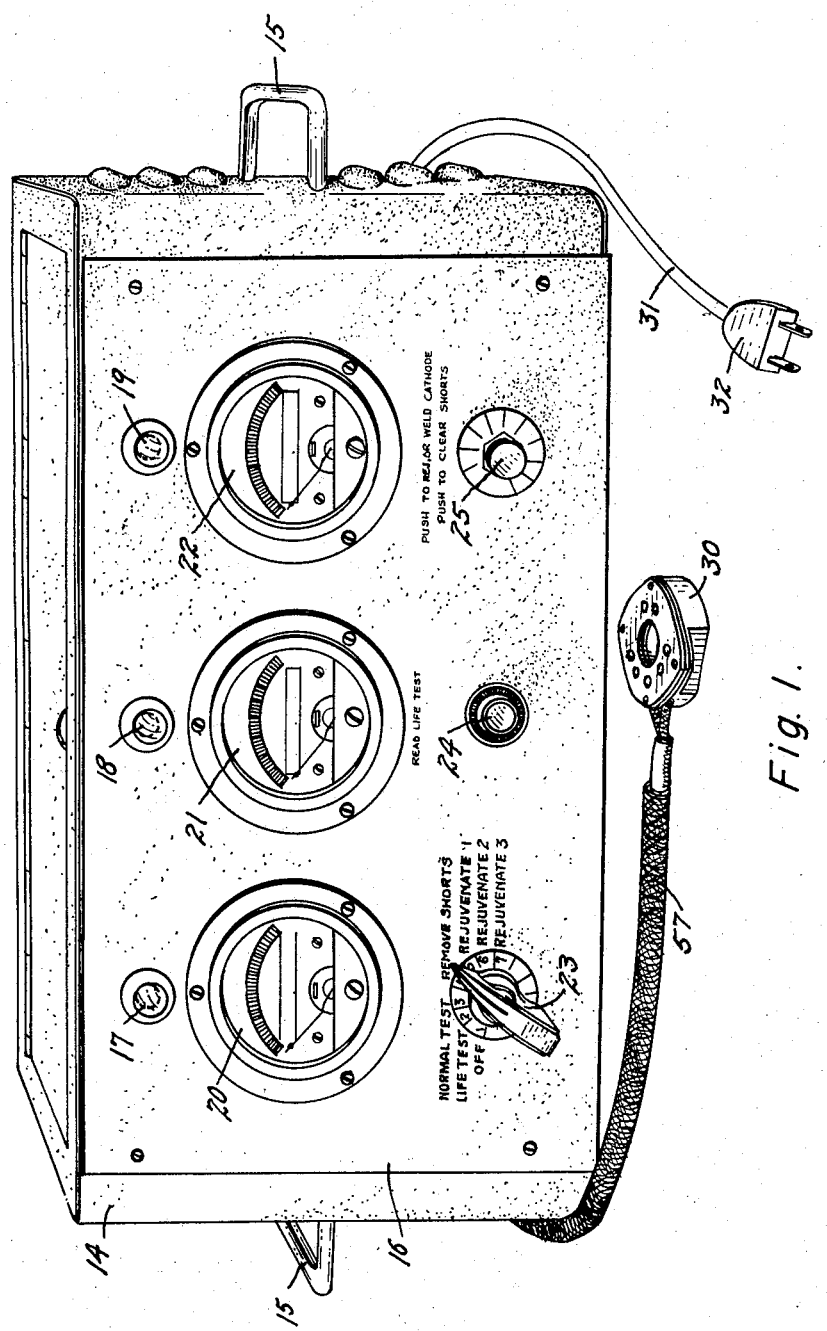

July 28, 1959  D. N. FISTELL  2,897,435
UNITS FOR ANALYZING, REJUVENATING AND
REPAIRING TELEVISION PICTURE TUBES
Filed Sept. 19, 1958  2 Sheets-Sheet 1

INVENTOR.
David N. Fistell
BY
ATTORNEY

INVENTOR.
DAVID N. FISTELL

United States Patent Office 2,897,435
Patented July 28, 1959

2,897,435

UNITS FOR ANALYZING, REJUVENATING, AND REPAIRING TELEVISION PICTURE TUBES

David N. Fistell, Denver, Colo.

Application September 19, 1958, Serial No. 762,058

1 Claim. (Cl. 324—23)

This invention relates to a unit for testing, analyzing, rejuvenating, and repairing television picture tubes.

Tests, of course can be run on cathode-ray tubes of the type used in television receivers by means of various conventional meters and conventional circuits, and some repairs can be accomplished by special "hook-ups." This procedure is time consuming and requires highly-skilled technicians to obtain satisfactory results and to avoid damaging usable tubes.

The principal object of this invention is to provide a single unitary, easily portable device which can be efficiently used by a relatively unskilled operator to not only quickly and easily diagnose the causes of unsatisfactory tube operation but also to quickly and easily repair all faults of a repairable nature.

Instruments have been proposed for analyzing and rejuvenating cathode ray tubes but these have not proven successful in the hands of the average repairmen due to the complexity of the controls which are necessary for connecting the tube elements in proper circuits with the test meter or test bulbs provided in the instrument for each of many necessary tests.

Another object of this invention is to provide preset circuits for each of the necessary tests and to provide a separate and independent indicating device for each circuit so that the condition of all elements of a tube being tested can be read simultaneously.

Instruments have been used which will remove "cathode-grid shorts" and others have been used which will in some cases reweld a broken cathode tab connection. These have been difficult to use since after each charge is applied to either burn out the short or reweld the tab, the tube must be disconnected from the charging source and meter tested to see if the desired result has been attained. This is a complicated, time-consuming operation and carelessness or inattention may result in damage to the test meter.

A further object in this invention is to provide a press-button-operated circuit in combination with test meters in which an instantaneous short-removing or tab-welding charge can be applied to the tube elements by a quick pressure on the press-button and in which, when the press button is released, the meters will instantly indicate whether the desired repair has been accomplished, without danger of damage to the meters.

A still further object is to combine in a single instrument means for reactivating and restoring electron emission, for restoring grid control, and for rewelding cathode tabs with controlled direct-current voltage, and for removing cathode-grid shorts with controlled alternating-current voltages all with instant meter test readings.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figure 2:
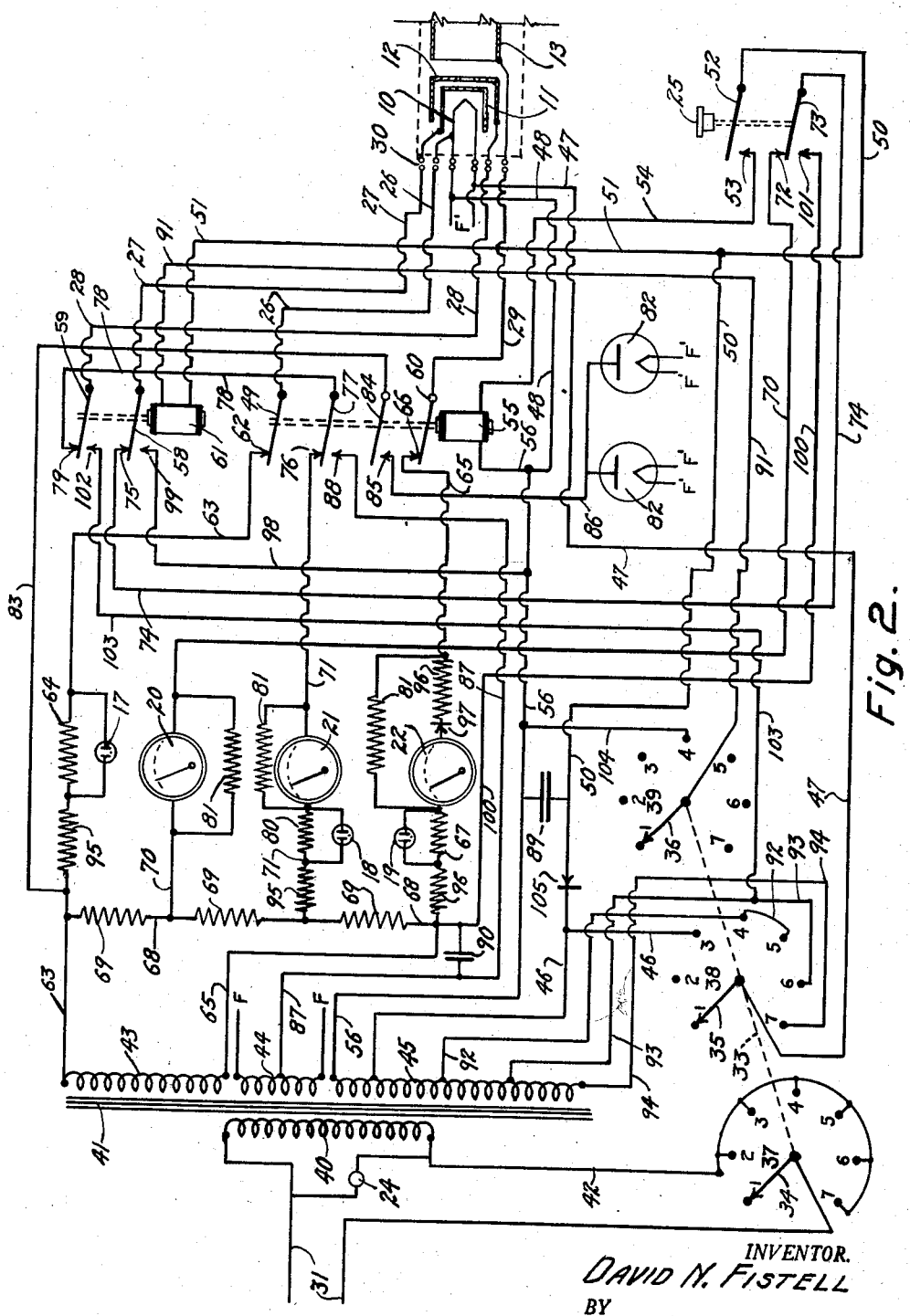

In the drawing:

Fig. 1 is a perspective view of the complete, portable, picture tube testing and repairing unit; and Fig. 2 is a circuit diagram of the improved television tube analyzing and repairing unit.

The elements of an electron gun of a television picture tube are diagrammatically indicated and designated by numeral as follows: filament or heater 10, cathode 11, control grid 12, and first anode 13.

The unit is preferably mounted in a suitable cabinet 14 provided with convenient carrying handles 15. An instrument panel 16 on the front of the cabinet carries: three neon indicating lamps 17, 18 and 19; three microammeters 20, 21 and 22; a rotary switch knob 23; an "on-off" lamp 24; and a press-button 25. Conventional supply conductors 31 provided with a supply plug 32 furnish the operating current. The rotary switch knob 23 is mounted on a switch shaft indicated in broken line at 33 in Fig. 2 for rotating three rotary switch blades 34, 35 and 36 positioned in separate switch banks 37, 38 and 39 respectively. Each switch bank is provided with seven contacts numbered 1, 2, 3, 4, 5, 6 and 7, the contact "1" in each bank being open for an "off" position. The numbered contacts in each bank are in alignment with each other.

The contacts "2" through "7" of the first switch bank 37 are connected together and to one side of a primary 40 of a current transformer 41 by means of a conductor 42. The current supply conductors 31 are connected to the other side of the primary 40 and to the first rotary switch blade 34, respectively, so that when the blade is turned to the contact "2", the primary 40 is energized to simultaneously induce current in a current secondary 43, a filament secondary 44 and a multitap secondary 45. Therefore the first bank serves simply as an "on-off" switch for the transformer 41.

A flexible multiple conductor cord 57 extends from the cabinet 14 and terminates in a multiple tube socket 30 for receiving the prongs of a conventional picture tube. The multiple cord contains conventional filament leads for the heater 10, a heater conductor 26, a cathode conductor 27, a grid conductor 28, and an anode conductor 29 for conducting current to the respective named elements of the picture tube.

The heater conductor 26, the cathode conductor 27, the grid conductor 28, and the anode conductor 29 lead from relay switch blades 49, 58, 59 and 60, respectively. The switch blades 59 and 58 are actuated from a button relay coil 61 and the switch blades 49 and 60 are actuated from a main relay coil 55.

The heater switch blade 49 is normally in contact with a relay contact 62 which is connected by means of conductor 63 with the terminal of the current secondary 43 of the current transformer 41. The first neon lamp 17, is bridged across a suitable resistor 64 in the conductor 63 so that current flowing in the latter will illuminate the lamp 17.

Alternating-current from the other side of the secondary 43 is applied, through a conductor 65, and a relay contact 66 to the relay switch blade 60 thence through the conductor 29 to the anode 13. The third meter 22 is in series with the conductor 65 and the third neon lamp 19 is bridged across a suitable resistor 67 connected in series with the conductor 65 so as to be illuminated by current flowing in the latter.

A resistance shunt circuit 68 containing three suitably balanced resistors 69 is connected between the two conductors 63 and 65 to supply current to two reduced voltage conductors 70 and 71. The first reduced voltage conductor 70 leads through a button contact 72, a button switch blade 73, a conductor 74 and a relay contact 75, to the relay switch blade 58, thence through the cathode conductor 27 and the socket 30 to the cathode 11 of the picture tube. The first meter 20 is in series with the first reduced voltage conductor 70.

The second reduced voltage conductor 71 leads through a relay contact 76, a relay switch blade 77, an inter-relay conductor 78, a relay contact 79, to the relay switch blade 59 and the grid conductor 28 to the grid 12 of the picture tube. The second meter 21 is in series with the second reduced voltage conductor 71 and the second neon lamp 18 is bridged across a suitable resistor 80 connected in series with the conductor 71 to be illuminated by current flowing in the latter.

The meters 20, 21 and 22 are provided with selected bridging resistors 81 to properly orient their indications. The terminals of the filament secondary 44 indicated at F are permanently connected to the filaments of two rectifier tubes 82, as indicated at F and to the terminals of the heater 10 to heat the heater. Alternating-current is also supplied to the two rectifier tubes 82 from the current secondary 43 through a rectifier conductor 83, a relay switch blade 84, a relay contact 85 and a second rectifier conductor 86. Direct current is conducted from the filaments of the rectifier tubes to the filament secondary 44 through the filament current leads F and F' and from thence through a direct-current conductor 87 to a relay contact 88 adapted to be contacted by the relay switch blade 77. The blade 77, as before described, is connected to the grid 12 of the picture tube. A condenser 90 is bridged between the conductor 65 and the direct-current conductor 87.

Direct-current is supplied to one terminal of the main relay actuating coil 55 from a top 46 on the multitap secondary 45, through a rectifier 105, a conductor 50, a second button switch blade 52, a button contact 53, and a second relay conductor 54. Direct-current is supplied to the other terminal of the main relay coil 55 through a return relay conductor 56 connected to a terminal on the multitap secondary 45. A condenser 89 is bridged across the relay conductors 50 and 56. Direct-current is supplied to the button relay coil 61 from the relay conductor 50 through a relay conductor 51 and through a rotary switch conductor 91 connected to the third rotary switch blade 36.

A heater conductor 47 is connected between the second rotary switch blade 35 and one side of the filament of the heater 10.

A low-voltage-high-current tap 92 (approx. 6 v.) is connected between the secondary 45 and contacts "4" and "5" on the second rotary switch bank 38. An intermediate-voltage-high-current tap 93 (approx. 10 v.) is connected between the secondary 45 and the contact "6" on the rotary switch bank 38; and a high-voltage-high-current tap 94 is connected between the secondary 45 and the contact "7" on the rotary switch bank 38. The voltages in the conductor 63 and in the reduced voltage conductors 65 and 71 are preset by means of suitable resistors 95 and 96 to the desired potential. A rectifier 97 is included in the reduced voltage conductor 65 to place a positive charge on the anode 13.

A cathode charging conductor 98 is connected from the terminal of the multitap secondary 45 to a relay contact 99 positioned to be closed by the relay switch blade 58 when the button relay coil 61 is energized. A cathode feed conductor 100 is connected from the current secondary 43, to a button contact 101 positioned to be closed by the second press button switch blade 73 when the button 25 is depressed to impress current on the cathode 11 through the relay switch blade 58 when the button relay coil is deenergized. A grid conductor 103 is connected between the intermediate current tap 93 and a relay contact 102 positioned to be contacted by the relay switch blade 59 when the button relay coil 61 is energized to conduct current to the grid 12 when desired.

In the following description, the various "positions" of the rotary switch knob are designated by number corresponding to the number of the contact being closed by the rotary switch blades. These positions are designated by suitable index legends on the panel as shown in Fig. 1.

Let us assume that the supply plug 32 is connected to a source of alternating-current power and that the socket 30 has been properly positioned upon a tube to be tested.

*Position No. 3—"Normal test"*

The rotary switch knob is rotated to place the three rotary switch blades on their respective contacts "3" for the purpose of determining the presence of "shorts", open cathode and grid connections and the quality of the electron emission in the picture tube.

The first switch blade 34 closes the feed circuit to the transformer 41 causing the filament secondary 44 to supply heating current to the filaments of the rectifier tubes 82 and to the tube heater 10; through the meter 20 and the relay blade 58 to the tube cathode 11; through one electrode of the neon lamp 18 and the meter 21 by way of the relay blades 77 and 59 to the tube grid 12; and through the third meter 22 and one electrode of the third neon lamp 19 and relay blade 60 to the tube anode 13. A cathode-to-grid short will light both electrodes of the second neon lamp 18. A heater-to-cathode short will light both electrodes of the first neon lamp 17. An open cathode tab will be indicated by a zero indication on the first meter 20 and an open grid tab will be indicated by a zero indication on all meters and the degree of emission will be indicated on all meters.

*Position No. 4—"Short removal"*

If a short has been detected, the rotary switch knob is turned to position "4". This places the second relay blade 35 in circuit between a low-voltage-high-current transformer tap 92 and a heater conductor 47 leading to one side of the heater filament 10. The other side of the heater filament 10 is connected to the terminal of the multitap secondary 45 as shown at 48 and 56. This also places the third rotary blade 36 on contact "4" of the third bank 39. This connects the button relay coil 61 to the return conductor 56 through a conductor 104. The other pole of the coil 61 is connected by means of the relay conductor 51 and the conductors 50 and 46 with the secondary 45. So that the button relay coil 61 is instantly energized to close contacts at 59–102 and 58–99 to the cathode 11 and grid 12.

The press button 25 is to throw a low-voltage-high-current across the grid and cathode to burn out the shorts.

Depression of the button 25 also closes the contact 53 to energize the main relay coil 55 to open the contacts 62, 76 and 66 to prevent damage to the meters and lamps.

*Position No. 5—"Rejuvenation"*

If the third meter 22 shows low emission, the rotary switch knob is turned to place the rotary switch blades on their contacts "5" to break the circuit to the button relay coil 61. The press button is now depressed to throw high-voltage direct-current (1000–1200 v.) across grid-to-cathode (grid positive-cathode negative) to obtain an electron reversal for reviving a spent tube.

Position number 5 is also used to weld an open cathode lead. When the button 25 is depressed in this position the high-voltage-high-amperage current from the rectifiers 82 and condenser 90 is discharged, when circuit is closed by tapping the tube to form an arc and weld the bank.

*Position Nos. 6 and 7—"Rejuvenation high and super"*

After each of the above repair procedures, the press button 25 is released to place the meters and lamps immediately back in circuit so that the results obtained can be immediately determined.

It is desired to call attention to the condensers 89 and 90. The former discharges when the circuit to the main relay coil 55 is completed at 53 to produce an instant positive action of the relay. The condenser 90 discharges when the heavy welding charge is thrown across the grid.

"Life test position"

When all corrections possible have been made, the knob is turned to position No. 2 which places the rotary switch blades on their contacts "2" and allows the cathode to cool down. The cooling time element is noted on the second or grid meter 21. The greater the amount of barium on the cathode, the longer it will retain heat. Therefore, since the greater the time element, the greater the life expectancy and the tube life expectancy can be determined by the time lapse before the needle of the grid meter falls to zero. New cathode ray tubes have a normal time lapse of from 15 to 30 seconds.

Thus, it can be seen that all conditions are instantly discernable by the lamps 17, 18 and 19 and the meters 20, 21 and 22 and the circuits can be quickly set up to correct the indicated faults by simply rotating the switch knob. It can be also seen that the corrective circuits can be energized by simply pressing the button and that when the button is pressed to energize the corrective circuits, the lamps and meters are automatically cutoff so as not to be damaged by the correction currents and instantly return to the indicating positions when the button is released.

Briefly, the directions for operation are:

Turn knob to position "3" and note opens and shorts as indicated by neon bulbs. Note reading of emission or grid, cathode and anode as shown on three panel meters. Excess gas content is reflected by excessive high current on meter 20.

After determining the presence of a grid-cathode short, set knob position "4," depress button 25 and hold in for a short period (2 to 5 seconds), releasing to check if short still remains; if so repeat. If normal indication appears on neon bulbs, yet meter 21 fails to give reading, a cathode-grid short still exists and cathode tab has been burned open, and the tube is not salvageable.

Turn knob to "5" position. This position is used for all normal rejuvenation. After warmup of tube, depress press button fully, (momentary contact), and release. This may be done several times if necessary, however, the short lights and meters should be carefully examined each time to determine condition of the tube. Excess heat may warp grid so that it arcs to the cathode and may even burn open the aperture increasing its electron flow, that is, picture brightness during normal operation. This will be indicated by the meter 20 which will read above normal.

To weld an open cathode, depress button and hold while tapping neck of picture tube. When contact is made to the cathode tab, weld will become automatic, and a loud chatter or hum will be heard from the power supply and a blue flash will appear in the rectifier tubes 82 as the weld is being accomplished. The button must be released immediately thereafter, or the weld may be re-opened. Depress button again, momentary contact and tap neck of tube to assure a solid weld. If cathode re-opens, repeat above procedure.

Turn knob to "6" and "7" positions. These positions used only in extreme cases for both weld and rejuvenation. Slow warmup is recommended to prevent burnout of filament.

Now turn knob back to "2" position. This position is used only as a follow up to the normal test position. Tube life expectancy is determined by time lapse before the meter 20 falls to zero.

While a specific form of the improvement has been described and illustrated herein, it is to be understood that the same may be varied, within the scope of the appended claim, without departing from the spirit of the invention.

Having thus described the invention, what is claimed and desired secured by Letters Patent is:

A unit for testing and repairing television picture tubes of the type having a heater, a cathode, a grid and an anode comprising: a first A.C. supply; a second A.C. supply; a filament circuit connecting said second A.C. supply with the tube heater for energizing the latter; a first A.C. conductor leading from one terminal on said first A.C. supply to said heater; a first rectifier; a second A.C. conductor leading from an opposite terminal on said first A.C. supply to said first rectifier; a D.C. conductor leading from said rectifier to said anode; a shunt circuit connected between said first and second A.C. conductors containing a first, second and third resistor in series; a first reduced-voltage circuit connected to said shunt circuit between the first and second resistors and leading to the tube cathode; a second reduced voltage circuit connected to said shunt circuit between the second and third resistors and leading to the tube grid; a cathode current meter in series with the first reduced voltage circuit; a grid current meter in series with said second reduced voltage circuit; an anode current meter in series with said second A.C. conductor; a first gaseous discharge lamp in said first A.C. conductor; a second gaseous discharge lamp in said second reduced voltage circuit; a third gaseous discharge lamp in said second A.C. conductor; and means for energizing said A.C. current supplies so that said gaseous lamp will indicate current flow and direction of current flow and said meters will indicate the amount of current flow in their respective circuits, and a third A.C. supply having multi-taps for delivering progressively higher voltage than said second A.C. supply in combination with means for connecting any desired tap of said third A.C. supply to said heater in superimposed relation to the current supply to said heater from said second A.C. supply, a second rectifier connected to said first A.C. conductor in low-voltage high-current relation, a D.C. circuit including said last mentioned rectifier and the tube heater to supply low-voltage high-current D.C. to the heater, means for connecting said second rectifier to said first A.C. conductor and simultaneously opening said first, second and third reduced voltage circuits to place said meters out of service when said low-voltage high-current D.C. is flowing, said means for simultaneously connecting said second rectifier to said first A.C. conductor and simultaneously opening said meter circuits comprising a first relay arranged to actuate a first, second and third as well as a fourth switch blade, the first blade being normally in circuit with said first A.C. conductor, the second blade being normally in circuit with the second reduced voltage circuit, the fourth blade being normally in circuit with the D.C. conductor, so that when said first relay is actuated said first A.C. conductor, said second reduced voltage circuit and said D.C. conductor are opened, and a two-bladed press button switch, the first blade of which is in circuit with said first relay to close an actuating circuit thereto and the second blade of which is in circuit with the first reduced voltage circuit so that when said press button switch is actuated, the first relay will be actuated and all meter circuits will be broken.

References Cited in the file of this patent

UNITED STATES PATENTS

| | | |
|---|---|---|
| 2,717,190 | Shoup | Sept. 6, 1955 |
| 2,757,316 | Ackerman | July 31, 1956 |
| 2,774,645 | Batchelor | Dec. 18, 1956 |
| 2,783,116 | Schaedler et al. | Feb. 26, 1957 |